(12) United States Patent
Saito et al.

(10) Patent No.: US 12,447,565 B2
(45) Date of Patent: Oct. 21, 2025

(54) LEAD-FREE AND ANTIMONY-FREE SOLDER ALLOY, SOLDER BALL, BALL GRID ARRAY, AND SOLDER JOINT

(71) Applicant: Senju Metal Industry Co., Ltd., Tokyo (JP)

(72) Inventors: Takashi Saito, Tokyo (JP); Hiroki Sudo, Tokyo (JP); Mai Susa, Tokyo (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 29 days.

(21) Appl. No.: 17/922,218

(22) PCT Filed: Apr. 29, 2021

(86) PCT No.: PCT/JP2021/017132
§ 371 (c)(1),
(2) Date: Oct. 28, 2022

(87) PCT Pub. No.: WO2021/221145
PCT Pub. Date: Nov. 4, 2021

(65) Prior Publication Data
US 2023/0173619 A1  Jun. 8, 2023

(30) Foreign Application Priority Data
Apr. 30, 2020 (JP) .................. 2020-080471

(51) Int. Cl.
*B23K 35/00* (2006.01)
*B23K 35/02* (2006.01)
*B23K 35/26* (2006.01)

(52) U.S. Cl.
CPC ........ *B23K 35/262* (2013.01); *B23K 35/0244* (2013.01)

(58) Field of Classification Search
CPC ........ B23K 35/24–262; B23K 35/0244; H05K 3/34; H05K 3/3457; C22C 13/00; H01L 21/50
USPC ............ 228/56.3, 180.22, 245–246; 257/737–738; 438/612–616
See application file for complete search history.

(56) References Cited

U.S. PATENT DOCUMENTS

| | | | |
|---|---|---|---|
| 8,020,745 B2 | 9/2011 | Ota et al. | |
| 8,031,437 B2 | 10/2011 | Suzuki et al. | |
| 8,343,383 B2 | 1/2013 | Ueshima | |
| 9,278,409 B2 | 3/2016 | Kawasaki et al. | |
| 9,340,850 B2 | 5/2016 | Shindo et al. | |
| 9,394,590 B2 | 7/2016 | Kanou | |
| 10,888,957 B2 | 1/2021 | Kawasaki et al. | |
| 11,590,614 B2 * | 2/2023 | Shirakawa | B23K 35/025 |
| 2012/0216787 A1 * | 8/2012 | Morita | C22C 13/00 125/21 |
| 2013/0243637 A1 * | 9/2013 | Katter | B03C 1/02 419/30 |
| 2015/0380373 A1 * | 12/2015 | Moon | H01L 24/17 257/738 |
| 2020/0070287 A1 * | 3/2020 | Mutuku | B23K 35/025 |

FOREIGN PATENT DOCUMENTS

| | | | | |
|---|---|---|---|---|
| CN | 103341699 A | | 10/2013 | |
| CN | 105392580 A | * | 3/2016 | ............. B22F 1/025 |
| CN | 105980087 A | * | 9/2016 | ............. B22F 1/0003 |
| CN | 106914675 A | * | 7/2017 | ......... B23K 35/0244 |
| CN | 105283267 B | * | 8/2018 | ............. B22F 1/0003 |
| EP | 2069101 B1 | * | 5/2018 | ............. B23K 35/262 |
| JP | S62230493 A | | 10/1987 | |
| JP | H328996 B2 | | 4/1991 | |
| JP | H09277081 A | * | 10/1997 | |
| JP | 2001335816 A | * | 12/2001 | |
| JP | 200220807 A | | 1/2002 | |
| JP | 2005334955 A | | 12/2005 | |
| JP | 2006909 A | | 1/2006 | |
| JP | 2007105750 A | | 4/2007 | |
| JP | 2008179902 A | * | 8/2008 | |
| JP | 2009151898 A | | 7/2009 | |
| JP | 4432041 B2 | | 1/2010 | |
| JP | 2010120030 A | | 6/2010 | |
| JP | 6700568 B1 | * | 5/2020 | ......... B23K 35/0222 |
| KR | 1020120106889 A | | 9/2012 | |
| KR | 20150056886 A | * | 5/2015 | |
| KR | 20160139585 A | * | 12/2016 | |
| KR | 20180002606 A | * | 1/2018 | |
| TW | 201546303 A | | 12/2015 | |
| TW | 201715047 A | | 5/2017 | |
| WO | 2007004394 A1 | | 1/2007 | |
| WO | 2008111615 A1 | | 9/2008 | |
| WO | WO-2016144945 A1 | * | 9/2016 | ............. B22F 1/0059 |

* cited by examiner

*Primary Examiner* — Kiley S Stoner
(74) *Attorney, Agent, or Firm* — The Webb Law Firm

(57) ABSTRACT

Provided are a lead-free and antimony-free solder alloy which has a medium-low melting point and ensures solderability even after being held at a high temperature for a long time, a solder ball, a ball grid array, and a solder joint. The lead-free and antimony-free solder alloy has an alloy composition consisting of 12 to 23% by mass of In, and 0.001 to 0.08% by mass of Ge, with the balance being Sn and unavoidable impurities. Preferably, the alloy composition has 16 to 21% by mass of In; the alloy composition has 0.005 to 0.01% by mass of Ge; the alloy composition has 0.005 to 0.009% by mass of Ge; U and Th as the unavoidable impurities are each included in an amount of 5 mass ppb or less; and As and Pb as the unavoidable impurities are each included in an amount of 5 mass ppm or less.

18 Claims, 3 Drawing Sheets

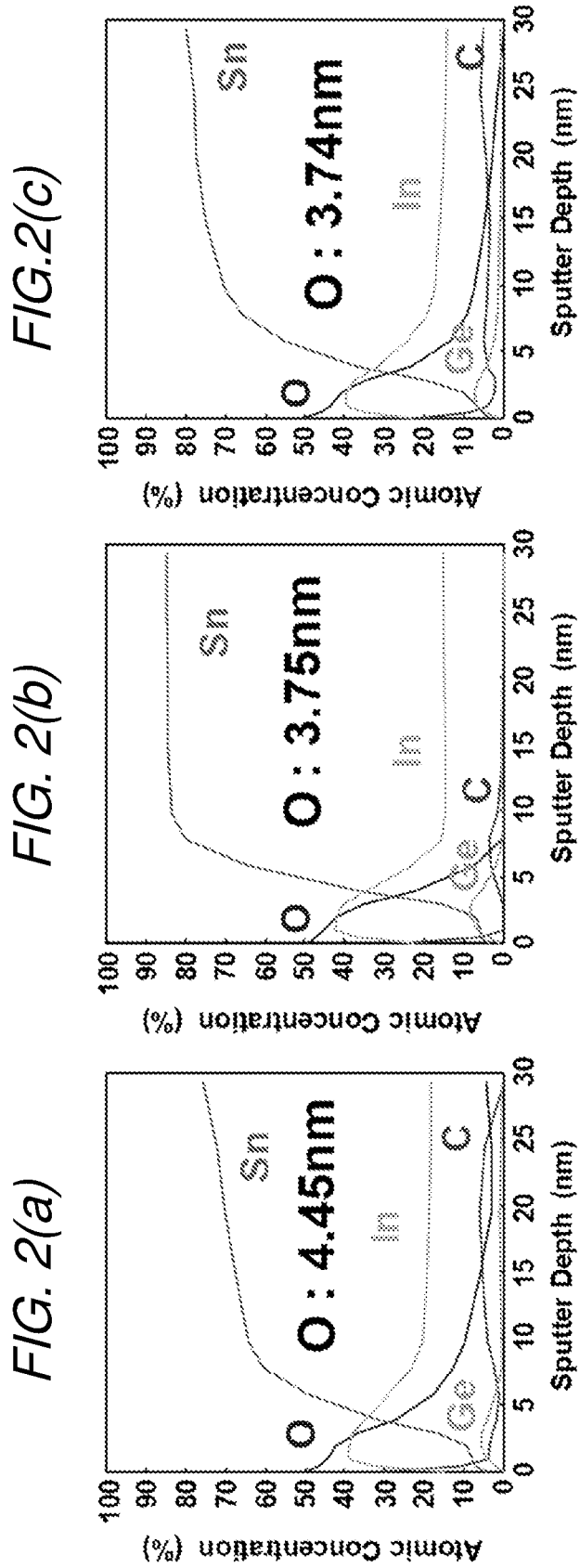

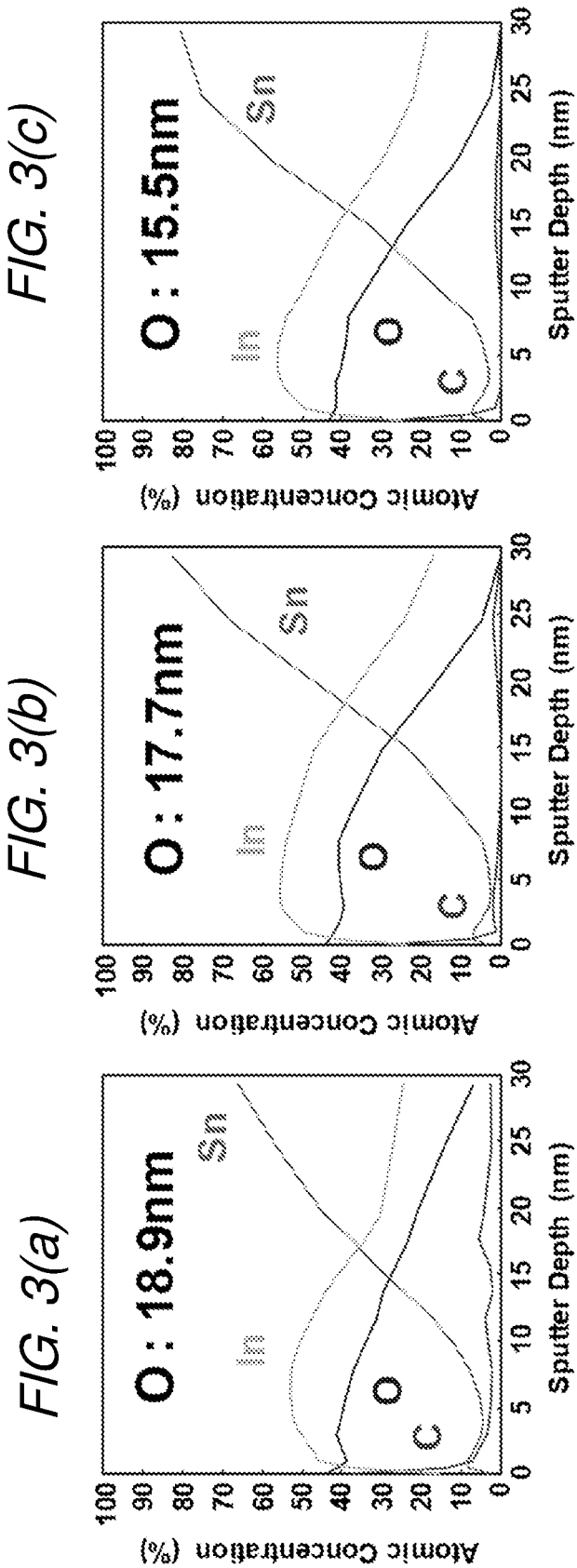

LEAD-FREE AND ANTIMONY-FREE SOLDER ALLOY, SOLDER BALL, BALL GRID ARRAY, AND SOLDER JOINT

CROSS-REFERENCE TO RELATED APPLICATIONS

This application is the United States national phase of International Application No. PCT/JP2021/017132 filed Apr. 29, 2021, and claims priority to Japanese Patent Application No. 2020-080471 filed Apr. 30, 2020, the disclosures of which are hereby incorporated by reference in their entirety.

BACKGROUND

Field

The present invention relates to a lead-free and antimony-free solder alloy, a solder ball, a ball grid array, and a solder joint.

Description of Related Art

In recent years, miniaturization of an electric device such as a CPU (Central Processing Unit) has been demanded. As the electric device is smaller, the thermal load at soldering increases and it is therefore desirable to carry out the soldering at a low temperature. If the soldering is carried out at the low temperature, it is possible to manufacture a highly reliable circuit board. In order to carry out the soldering at the low temperature, it is necessary to use a solder alloy having a low melting point.

Examples of the solder alloy having a low melting point include a 63Sn-37Pb solder alloy. The 63Sn-37Pb solder alloy has a melting point of about 183° C. However, due to concerns about adverse effects on the environment, the use of solder alloys containing Pb has been regulated in recent years.

Solder alloys having a low melting point that can replace solder alloys with a Sn—Pb compositions include a Sn-58Bi solder alloy and a Sn-52In solder alloy, as disclosed in JIS Z 3282 (2017). The Sn-58Bi solder alloy has a melting point of about 139° C. The Sn-52In solder alloy has a melting point of about 119° C. In particular, the Sn-58Bi solder alloy is widely used as a solder alloy having a low melting point which is low-cost and has excellent wettability.

By the way, in recent years, it has been pointed out that impurity elements contained in very small amounts in solder alloys emit alpha rays with time, and that the emitted alpha rays cause soft errors in semiconductors. In order to suppress such soft errors, it is necessary to use a solder alloy containing less impurities. However, since Bi contains a large amount of radioisotopes, it is difficult to obtain high-purity raw materials with low alpha-ray emission. Hence, it is difficult to suppress the occurrence of soft errors due to alpha-ray emission when using solder alloys with Sn—Bi compositions having a low-melting point.

Therefore, solder alloys with Sn—In compositions having a low-melting point have been studied. The following Patent Documents 1 and 2 relate to the solder alloys with Sn—In compositions having a low-melting point.

Patent Document 1: Japanese Unexamined Patent Application Publication No. 2007-105750
Patent Document 2: Japanese Unexamined Patent Application Publication No. 2006-000909

SUMMARY

Solder alloys consisting of Sn—In has a melting point varying from about 120° C. to about 230° C., depending on their In contents. Of these, a solder alloy having a melting point of 130° C. to 210° C. is desired. The reason for this is that the solder alloy is a solder alloy that should be called a medium-low-temperature solder alloy with an intermediate melting point between 220° C. which is the melting point of Sn-3Ag-0.5Cu medium-temperature solder alloy conventionally used and 119° C. which is the melting point of Sn-52In low-temperature solder alloy. Accordingly, in step soldering in which soldering is performed in multiple steps, a medium-temperature solder alloy does not remelt when soldering is performed using a medium-low temperature solder alloy after soldering using the medium-temperature solder alloy. When soldering is performed using a low-temperature solder alloy after soldering using a medium-low temperature solder alloy, the medium-low-temperature solder alloy does not remelt. Addition, in step soldering, the medium-low-temperature solder alloy may be held in a degree of a temperature range where the medium-low-temperature solder alloy does not melt before soldering in the process.

Thus, the solder alloy used for step soldering is required to have a melting point between that of conventional medium-temperature and low-temperature solder alloys, and at the same time to ensure solderability even after being held at a high temperature for a long time.

An object of the present invention is to provide a lead-free and antimony-free solder alloy which has a medium-low-melting point and ensures solderability even after being held at a high temperature for a long time, a solder ball, a ball grid array, and a solder joint.

The present inventors have once again begun their studies by starting with a Sn—In alloy consisting of two elements, Sn and In. This alloy forms a phase of an intermetallic compound called a γ-phase composed of In and Sn when an In content exceeds a certain level. However, since this γ-phase is brittle, there is a risk of lowering ductility of the solder alloy. The In content has been set to approximately 20 mass % so that the melting point would be in the a medium-low-temperature range of about 130° C. to about 200° C.

The present inventors have attempted to improve properties of solder alloys by adding various elements to ensure solderability after being held at a high temperature for a long time. The solder alloys with various elements added have been held at a high temperature for a long time and then analyzed in a depth direction by XPS (X-ray photoelectron spectroscopy). As a result, it has been found that an oxide film of a solder alloy with Ge added is especially thin. The reason for this is probably as follows: an In oxide film becomes amorphous by the addition of Ge, and grain boundaries of the In oxide film disappear, thereby suppressing diffusion of O.

The present inventions obtained from these finding are as follows.

(1) A lead-free and antimony-free solder alloy having an alloy composition consisting of, by mass %,
12 to 23% of In, and
0.001 to 0.08% of Ge, with the balance being Sn and unavoidable impurities.
(2) The lead-free and antimony-free solder alloy according to (1), wherein, by mass %,
the alloy composition has an In content of 16 to 21%.

(3) The lead-free and antimony-free solder alloy according to (1) or (2), wherein, by mass %,
the alloy composition has a Ge content of 0.005 to 0.01%.
(4) The lead-free and antimony-free solder alloy according to (1) or (2), wherein, by mass %,
the alloy composition has a Ge content of 0.005 to 0.009%.
(5) The lead-free and antimony-free solder alloy according to any one of (1) to (4),
comprising U and Th as the unavoidable impurities each in an amount of 5 mass ppb or less and As and Pb as the unavoidable impurities each in an amount of 5 mass ppm or less.
(6) The lead-free and antimony-free solder alloy according to any one of (1) to (5), by mass %,
further comprising at least one of 3.5% or less of Ag, 0.7% or less of Cu, 0.05% or less of Ni, and 0.02% by mass or less of Co.
(7) A solder ball comprising the lead-free and antimony-free solder alloy according to any one of (1) to (6).
(8) The solder ball according to (7), having an average diameter of 1 to 1,000 μm.
(9) The solder ball according to (7), having an average diameter of 1 to 100 μm.
(10) The solder ball according to any one of (7) to (9), having a sphericity of 0.95 or more.
(11) The solder ball according to any one of (7) to (9), having a sphericity of 0.99 or more.
(12) A ball grid array formed by using the solder ball according to any one of (7) to (11).
(13) A solder joint formed of the lead-free and antimony-free solder alloy according to any one of (1) to (6).

BRIEF DESCRIPTION OF THE DRAWINGS

FIG. 1 is a phase diagram of Sn—In.
FIGS. 2(a) to (c) show XPS analysis charts of the surfaces of the solder balls made of the solder alloy of Example 19. FIGS. 2(a) to (c) are each charts of different solder balls.
FIGS. 3(a) to (c) show XPS analysis charts of the surfaces of the solder balls made of the solder alloy of Comparative Example 4. FIGS. 3(a) to (c) are each charts of different solder balls.

DETAILED DESCRIPTION

Figure 1:
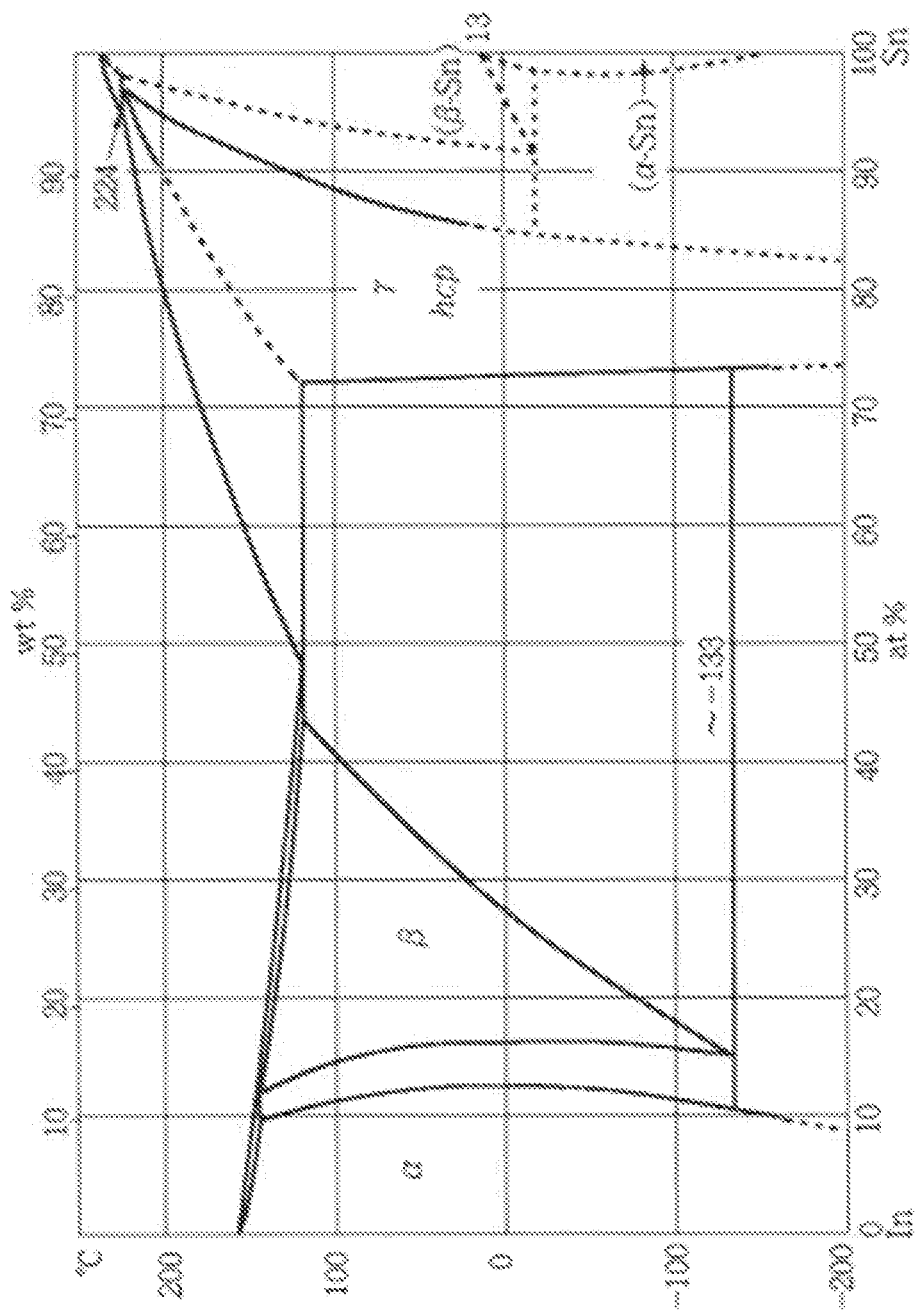

The present invention will be described in more detail below. Herein, "%" used for indicating an alloy composition of a solder alloy is "mass %" unless otherwise specified. "ppm" used for indicating an alloy composition of a solder alloy is "mass ppm" unless otherwise specified. "ppb" used for indicating an alloy composition of a solder alloy is "mass ppb" unless otherwise specified.
1. Alloy Composition of Solder Alloy
(1) 12 to 23% of In
In has the property of lowering the melting point of the solder alloy. FIG. 1 is a phase diagram illustrating a relationship between the In content in a Sn—In alloy and the melting point. As shown in FIG. 1, the melting point of the Sn—In alloy tends to decrease with an increase in the In content.
However, when the In content exceeds more than 20%, the solidus temperature begins to drop sharply. When the In content exceeds 25%, the solidus temperature decreases to about 117° C. Therefore, a solder alloy based on an alloy with an In content of more than 25% is not suitable as a solder alloy to be used for soldering in the medium-temperature range. In this regard, if the In content is, in value of the upper limit, approximately 23%, conditions of the solidus temperature are satisfied. Consequently, in terms of the upper limit, the In content is 23% or less. In view of fulfillment of the conditions of the solidus temperature, the In content is, in terms of the upper limit, preferably 21% or less, and further preferably is 20% or less.
On the other hand, if the In content is less than 12%, the liquidus temperature increases, making it difficult to obtain the desired melting point. In terms of the lower limit, the In content is 12% or more and preferably 16% or more.
(2) 0.001 to 0.08% of Ge
Ge has the properties of suppressing oxidation of Sn and improving the wettability of the solder alloy. Although P was conventionally considered to be an element that also provides the same effect, no effect was exhibited in compositions containing P in the present invention. The reason for this is probably as follows. It is considered that the oxide film formed on the surface of the solder alloy becomes thicker under the high temperature environment as oxygen penetrates the solder alloy due to grain boundary diffusion of oxygen. Therefore, the conventional oxide film which is composed of crystalline phases, is thicker due to the presence of many grain boundaries that serve as oxygen penetration pathways. However, when Ge is added to the Sn—In solder alloy, the negative heat of mixing inhibits the precipitation of the crystalline phases, and the oxide film of In formed on the surface of the solder alloy becomes amorphous so that the grain boundaries for oxygen diffusion disappear. Therefore, it is presumed that the oxide film is not thick even after being held at a high temperature for a long time, and that high solderability is thus maintained. Hence, the present inventors have found that the inclusion of Ge is an essential feature to obtain the desired properties.
When the Ge content was less than 0.001%, the effect of keeping the thin oxide film even after being held at a high temperature for a long time was not exhibited. Accordingly, in terms of the lower limit, the Ge content is 0.001% or more, preferably 0.003% or more, more preferably 0.004% or more, even more preferably 0.005% or more, and even yet more preferably 0.007% or more. On the other hand, if the Ge content is excessive, the liquidus temperature increases, making it difficult to obtain the desired melting point. It also makes it difficult to granulate solder balls. Accordingly, in terms of the upper limit, the Ge content is 0.08% or less, preferably 0.05% or less, more preferably 0.01% or less, particularly preferably 0.009% or less, and most preferably 0.008% or less.
(3) Balance: Sn
The balance of the solder alloy according to the present invention is Sn. However, it does not exclude the inclusion of elements as unavoidable impurities. Specific examples of the unavoidable impurities include As and Cd. Furthermore, although the solder alloy according to the present invention is lead-free and antimony-free, it does not exclude the inclusion of Pb and Sb as unavoidable impurities.
(4) Optional Additive Element
The solder alloy according to the present invention consists of, by mass, 12 to 23% of In, and 0.001 to 0.08% of Ge, with the balance including Sn and unavoidable impurities. In order to further improve the properties of the solder alloy, however, Ag, Cu, Ni, and Co elements may be optionally added as long as the solidus temperature and the liquidus temperature are in the range of 130° C. or more and the range of 210° C. or less, respectively. Specifically, each element may be optionally added in a range of 3.5% or less of Ag, 0.7% or less of Cu, 0.05% or less of Ni, and 0.02% or less of Co. More preferably, each element may be optionally added in a range of 3.0% or less of Ag, 0.5% or less of Cu, 0.03% or less of Ni, and 0.01% or less of Co.

Ag together with In forms a compound $Ag_2In$. When a phase of this intermetallic compound is precipitated, the deformation of the solder alloy can be suppressed. Cu forms a compound $Cu_6Sn_5$. When this intermetallic compound is precipitated, precipitation hardening of the solder alloy can be caused. Ni refines an alloy structure. The finer alloy structure improves mechanical properties of the solder alloy. Co also contributes to the mechanical properties of the solder alloy by refining the alloy structure. Optional additive elements may be added singly, or two or more of Ag, Cu, Ni, and Co may be added simultaneously as long as the solidus temperature and the liquidus temperature are in the range of 130° C. or more and the range of 210° C. or less, respectively.

(5) Contents of U and Th as Unavoidable Impurities: 5 ppb or Less Each; and Contents of As and Pb as Unavoidable Impurities: 5 ppm or Less Each The solder alloy according to the present invention does not exclude the inclusion of elements as unavoidable impurities as described above. In order to suppress soft errors in semiconductors due to the emission of alpha rays, however, it is preferable to further reduce the contents of the following elements. Specifically, the U and Th contents are each preferably 5 ppb or less and more preferably 2 ppb or less. The As and Pb contents are each preferably 5 ppm or less, more preferably 2 ppm or less, and further preferably 1 ppm or less.

(6) Melting Point

The solder alloy according to the present invention preferably has a solidus temperature of 130° C. or more in view of the suitability for use as a medium-low-temperature solder. If the solidus temperature is 130° C. or more, it is possible to suppress the remelting of the solder alloy according to the present invention that has already been soldered during soldering with a low-temperature solder in step soldering. The low-temperature solder alloy is, for example, a Sn-52In solder alloy which has a melting point of about 119° C. The solidus temperature of the solder alloy according to the present invention is preferably 150° C. or more. If the solidus temperature of the solder alloy according to the present invention is 150° C. or more, a Sn-58Bi solder alloy which has a melting point of about 139° C. can also be used as a low-temperature solder alloy in step soldering. The solidus temperature of the solder alloy according to the present invention is more preferably 165° C. or more.

The solder alloy according to the present invention preferably has a liquidus temperature of 210° C. or less in view of the suitability for use as a medium-low-temperature solder alloy. If the liquidus temperature is 210° C. or less, it is possible to prevent remelting of the medium-temperature solder alloy that has already been soldered during the soldering of the solder alloy according to the present invention in step soldering. Similarly, it is also possible to prevent remelting of a high-temperature solder. The medium-low-temperature solder alloy is, for example, a Sn-3Ag-0.5Cu solder alloy, which has a melting point of about 220° C. The high-temperature solder alloy is, for example, a Sn-90Pb solder alloy, which has a solidus temperature of about 270° C. and a liquidus temperature of about 300° C. The liquidus temperature of the solder alloy according to the present invention is preferably 200° C. or less.

(7) Oxide Film Thickness

Even after long-time exposure to high-temperature environment, the solder alloy according to the present invention does not form a thick Sn oxide film, and the thickness of the oxide film is kept thin. The reason for this is not clear, but is probably as follows, as mentioned above: an In oxide film becomes amorphous due to Ge, and grain boundaries of the In oxide film disappear, thereby suppressing diffusion of O.

In the present invention, the measurement of oxide film thickness can be performed, for example, by the following method. A sample with a size of 5.0 mm×5.0 mm is prepared (if the solder material is not in a plate shape, the solder material (a solder powder, a solder ball, etc.) is put in an area of 5.0 mm×5.0 mm without any gap). In this sample, an arbitrary area of 100 μm×100 μm is selected, and XPS analysis is performed for atoms of Sn, O, In, C, and other additive elements while performing ion sputtering, to thereby obtain an XPS analysis chart. One area is selected in each sample, and the analysis is performed once in each of three samples, i.e., three times in total. In the obtained XPS analysis chart, the abscissa can be either one of sputtering time (min) and a depth (nm) in terms of $SiO_2$ calculated based on the sputtering time with a sputter etching rate of a $SiO_2$ standard test sample, while the ordinate indicates the detected intensity (cps). In the description for the measurements hereinafter, the abscissa in the XPS analysis chart indicates the depth (nm) in terms of $SiO_2$ calculated based on the sputtering time with the sputter etching rate of the $SiO_2$ standard test sample.

In the XPS analysis chart of each sample, a depth in terms of $SiO_2$ at which the detected intensity of O atom was maximum is defined as Do·max (nm). In addition, the first depth in terms of $SiO_2$ at which the detected intensity of O atom is a half of the maximum detected intensity (intensity at Do·max) in a portion deeper than Do·max is defined as D1 (nm).

The oxide film thickness (in terms of $SiO_2$) is preferably less than 7 nm, more preferably 6 nm or less, and most preferably 4 nm or less. If the oxide film thickness is within the above range, a solder material with excellent wettability can be obtained.

2. Solder Ball and Ball Grid Array

The solder alloy according to the present invention is most suitably used in the form of a solder ball. The sphericity of the solder ball is preferably 0.90 or more, more preferably 0.95 or more, and most preferably 0.99 or more. The sphericity is determined by various methods such as the least squares circle method (LSC method), the minimum zone circle method (MZC method), the maximum inscribed circle method (MIC method), and the minimum circumscribed circle method (MCC method). In the present invention, the sphericity of the solder ball is measured using a CNC image measuring system (Ultra Quick Vision ULTRA QV350-PRO measuring device manufactured by Mitutoyo Corporation) using the minimum zone circle method (MZC method). In the present invention, the sphericity represents a deviation from the true sphere, and for example, the sphericity is an arithmetic mean value calculated when the diameter is divided by the major axis for each of 500 balls. The closer the value of the sphericity is to 1.00, which is the upper limit, the closer it is to a true sphere.

The solder ball according to the present invention is used for forming bumps on electrodes and substrates of semiconductor packages such as ball grid array (BGA). The diameter of the solder ball according to the present invention is preferably within the range of 1 to 1,000 μm and more preferably 1 to 100 μm. The solder ball can be manufactured by a general method for manufacturing solder balls. The diameter in the present invention means the diameter measured by Ultra Quick Vision ULTRA QV350-PRO measuring device manufactured by Mitutoyo Corporation.

Furthermore, flux may be applied onto the surface of the solder ball according to the present invention.

3. Solder Joint

The solder joint according to the present invention is suitable for connection between an IC chip in a semiconductor package and a substrate (interposer) therein, or for connection between the semiconductor package and a printed wiring board. Here, the term "solder joint" according to the present invention refers to a connection part between an IC chip and a substrate, which is connected with the solder alloy according to the present invention described above, and the connection part includes a connection for an electrode or a connection part between a die and the substrate.

4. Other

The solder alloy according to the present invention is suitable for use in the form of a solder ball, but it is not limited only to the form of the solder ball. For example, it can be used for linear solder, resin flux-cored solder, which contains flux in linear solder, molded solder, bar solder, and solder paste, which is obtained by mixing solder powder with flux.

A bonding method involving use of the solder alloy according to the present invention may be performed according to an ordinary method, e.g., a reflow method. The heating temperature may be appropriately adjusted depending on a heat resistance of the chip or the liquidus temperature of the solder alloy. When the joining is performed with the solder alloy according to the present invention, the structure can be further refined by taking the cooling rate during solidification into consideration. For example, the solder joint is cooled at a cooling rate of 2 to 3° C./s or more. Other bonding conditions can be appropriately adjusted depending on the alloy composition of the solder alloy.

Examples

The solder alloys shown in Tables 1 to 3 were evaluated for liquidus temperature, solidus temperature, and the thickness of the surface oxide film after long-time holding at high temperature.

(1) Liquidus Temperature and Solidus Temperature

Solidus and the liquidus temperatures were measured by the same method using DSC (differential scanning calorimetry) as the measurement method according to JIS Z 3198-1. Samples with a solidus temperature of 150° C. or more were evaluated as "Excellent", samples with a solidus temperature of 130° C. or more and less than 150° C. were evaluated as "Good", and samples with a solidus temperature less than 130° C. were evaluated as "Poor". Specifically, Example 7 was rated as "Excellent," in which the found solidus temperature was 187° C. Example 14 was rated as "Excellent," in which the found solidus temperature was 166° C. Comparative Example 7 was rated as "Excellent," in which the found solidus temperature was 204° C., and Comparative Example 8 was rated as "Poor," in which the found solidus temperature was 117° C.

Samples with a liquidus temperature of 210° C. or less were evaluated as "Good", and samples with a liquidus temperature more than 210° C. were evaluated as "Poor". Samples with a liquidus temperature of 200° C. or less were evaluated as "Excellent". Specifically, Example 7 was rated as "Good," in which the found liquidus temperature was 203° C. Example 14 was rated as "Excellent," in which the found liquidus temperature was 195° C. Comparative Example 7 was rated as "Poor," in which the found liquidus temperature was 219° C., and Comparative Example 8 was rated as "Excellent," in which the found liquidus temperature was 185° C.

(2) Thickness of Surface Oxide Film after long-time Holding at High Temperature

Solder balls having a diameter of 0.6 mm were made of the solder alloys shown in Tables 1 to 3. After Cu electrodes were disposed in a predetermined pattern on a printed circuit board and subjected to surface treatment with a preflux (OSP: organic solderability preservative), a water soluble flux (WF-6400 manufactured by Senju Metal Industry Co., Ltd.) was printed to a thickness of 100 μm on the Cu electrodes. After the solder balls previously prepared were mounted on the Cu electrodes, soldering was carried out by the reflow method to obtain test samples having solder joints formed thereon.

A thermostatic chamber containing an air atmosphere was heated to 125° C., and each test sample was left in the thermostatic chamber for 750 hours. After being heated for 750 hours, each of the test samples was analyzed in the depth direction using XPS to evaluate the thickness of an oxide film on the surface as follows.

(Analysis Conditions)

Analyzer: PHI Quantera II (manufactured by ULVAC-PHI, Inc.)

Analysis conditions: X-ray source AlKα-rays, X-ray gun voltage 15 kV, X-ray gun current value 10 mA, and analysis area 100 μm×100 μm Sputtering conditions: ion type Ar+, accelerating voltage 1 kV, and sputtering rate 1.0 nm/min (in terms of $SiO_2$)

(Evaluation Procedure)

In each sample, the XPS analysis was performed for atoms of Sn, Ge, O, In, C, and other additive elements while performing ion sputtering on the solder alloy portion of the solder joint to obtain an XPS analysis chart. One area was selected in each sample, and the analysis is performed once in each of three samples, i.e., three times in total. In the obtained XPS analysis chart, the abscissa can be either one of sputtering time (min) and a depth (nm) in terms of $SiO_2$ calculated based on the sputtering time with a sputter etching rate of a $SiO_2$ standard test sample, while the ordinate indicates the detected intensity (cps). In the description for the measurements hereinafter, the abscissa in the XPS analysis chart indicates the depth (nm) in terms of $SiO_2$ calculated based on the sputtering time with the sputter etching rate of the $SiO_2$ standard test sample.

In the XPS analysis chart of each sample, a depth in terms of $SiO_2$ at which the detected intensity of O atom was maximum was defined as Do max (nm). In addition, the first depth in terms of $SiO_2$ at which the detected intensity of O atom is a half of the maximum detected intensity (intensity at Do·max) in a portion deeper than Do·max was defined as D1 (nm).

When the samples had D1≤7 nm in all the three measurements, the solder alloy was rated as "Good", and when the samples had D1>7 nm in any one of the three measurements, the solder alloy was rated as "Poor".

(3) Total Evaluation

When "Poor" was given in any one of the above test items, the solder alloy was rated as "Poor" in the total evaluation; when "Poor" was given in no test item, the solder alloy was rated as "Good" in the total evaluation; and furthermore, when "Excellent" was given for both solidus and liquidus temperatures, the solder alloy was rated as "Excellent" in the total evaluation.

TABLE 1

| No. | Alloy composition (mass %) | | | | Solidus temperature | Liquidus temperature | Oxide film thickness | Total evaluation |
|---|---|---|---|---|---|---|---|---|
| | Sn | In | Ge | Other elements | | | | |
| EX. 1 | Bal. | 12 | 0.003 | | Excellent | Good | Good | Good |
| EX. 2 | Bal. | 12 | 0.004 | | Excellent | Good | Good | Good |
| EX. 3 | Bal. | 12 | 0.005 | | Excellent | Good | Good | Good |
| EX. 4 | Bal. | 12 | 0.008 | | Excellent | Good | Good | Good |
| EX. 5 | Bal. | 12 | 0.009 | | Excellent | Good | Good | Good |
| EX. 6 | Bal. | 12 | 0.01 | | Excellent | Good | Good | Good |
| EX. 7 | Bal. | 16 | 0.003 | | Excellent | Good | Good | Good |
| EX. 8 | Bal. | 16 | 0.005 | | Excellent | Good | Good | Good |
| EX. 9 | Bal. | 16 | 0.008 | | Excellent | Good | Good | Good |
| EX. 10 | Bal. | 16 | 0.009 | | Excellent | Good | Good | Good |
| EX. 11 | Bal. | 16 | 0.01 | | Excellent | Good | Good | Good |
| EX. 12 | Bal. | 20 | 0.003 | | Excellent | Excellent | Good | Excellent |
| EX. 13 | Bal. | 20 | 0.004 | | Excellent | Excellent | Good | Excellent |
| EX. 14 | Bal. | 20 | 0.005 | | Excellent | Excellent | Good | Excellent |
| EX. 15 | Bal. | 20 | 0.008 | | Excellent | Excellent | Good | Excellent |
| EX. 16 | Bal. | 20 | 0.009 | | Excellent | Excellent | Good | Excellent |
| EX. 17 | Bal. | 20 | 0.01 | | Excellent | Excellent | Good | Excellent |
| EX. 18 | Bal. | 20 | 0.03 | | Excellent | Excellent | Good | Excellent |
| EX. 19 | Bal. | 20 | 0.05 | | Excellent | Excellent | Good | Excellent |
| EX. 20 | Bal. | 20 | 0.08 | | Excellent | Excellent | Good | Excellent |
| EX. 21 | Bal. | 21 | 0.001 | | Good | Excellent | Good | Good |
| EX. 22 | Bal. | 21 | 0.003 | | Good | Excellent | Good | Good |
| EX. 23 | Bal. | 21 | 0.004 | | Good | Excellent | Good | Good |
| EX. 24 | Bal. | 21 | 0.005 | | Good | Excellent | Good | Good |
| EX. 25 | Bal. | 21 | 0.008 | | Good | Excellent | Good | Good |
| EX. 26 | Bal. | 21 | 0.009 | | Good | Excellent | Good | Good |
| EX. 27 | Bal. | 21 | 0.01 | | Good | Excellent | Good | Good |
| EX. 28 | Bal. | 23 | 0.001 | | Good | Excellent | Good | Good |
| EX. 29 | Bal. | 23 | 0.003 | | Good | Excellent | Good | Good |
| EX. 30 | Bal. | 23 | 0.004 | | Good | Excellent | Good | Good |
| EX. 31 | Bal. | 23 | 0.005 | | Good | Excellent | Good | Good |
| EX. 32 | Bal. | 23 | 0.008 | | Good | Excellent | Good | Good |
| EX. 33 | Bal. | 23 | 0.009 | | Good | Excellent | Good | Good |
| EX. 34 | Bal. | 23 | 0.01 | | Good | Excellent | Good | Good |
| EX. 35 | Bal. | 20 | 0.05 | Ag: 0.3 | Excellent | Excellent | Good | Excellent |
| EX. 36 | Bal. | 20 | 0.01 | Ag: 0.5 | Excellent | Excellent | Good | Excellent |
| EX. 37 | Bal. | 20 | 0.008 | Ag: 0.9 | Excellent | Excellent | Good | Excellent |

TABLE 2

| No. | Alloy composition (mass %) | | | | Solidus temperature | Liquidus temperature | Oxide film thickness | Total evaluation |
|---|---|---|---|---|---|---|---|---|
| | Sn | In | Ge | Other elements | | | | |
| EX. 38 | Bal. | 20 | 0.005 | Ag: 1.0 | Excellent | Excellent | Good | Excellent |
| EX. 39 | Bal. | 20 | 0.004 | Ag: 3.0 | Excellent | Excellent | Good | Excellent |
| EX. 40 | Bal. | 20 | 0.004 | Ag: 3.5 | Excellent | Excellent | Good | Excellent |
| EX. 41 | Bal. | 20 | 0.01 | Cu: 0.05 | Excellent | Excellent | Good | Excellent |
| EX. 42 | Bal. | 20 | 0.05 | Cu: 0.1 | Excellent | Excellent | Good | Excellent |
| EX. 43 | Bal. | 20 | 0.008 | Cu: 0.3 | Excellent | Excellent | Good | Excellent |
| EX. 44 | Bal. | 20 | 0.008 | Cu: 0.5 | Excellent | Excellent | Good | Excellent |
| EX. 45 | Bal. | 20 | 0.008 | Cu: 0.7 | Excellent | Excellent | Good | Excellent |
| EX. 46 | Bal. | 20 | 0.008 | Ni: 0.005 | Excellent | Excellent | Good | Excellent |
| EX. 47 | Bal. | 20 | 0.008 | Ni: 0.01 | Excellent | Excellent | Good | Excellent |
| EX. 48 | Bal. | 20 | 0.008 | Ni: 0.03 | Excellent | Excellent | Good | Excellent |
| EX. 49 | Bal. | 20 | 0.008 | Ni: 0.05 | Excellent | Excellent | Good | Excellent |
| EX. 50 | Bal. | 20 | 0.008 | Co: 0.001 | Excellent | Excellent | Good | Excellent |
| EX. 51 | Bal. | 20 | 0.008 | Co: 0.005 | Excellent | Excellent | Good | Excellent |
| EX. 52 | Bal. | 20 | 0.008 | Co: 0.008 | Excellent | Excellent | Good | Excellent |
| EX. 53 | Bal. | 20 | 0.008 | Co: 0.01 | Excellent | Excellent | Good | Excellent |
| EX. 54 | Bal. | 20 | 0.008 | Co: 0.02 | Excellent | Excellent | Good | Excellent |
| EX. 55 | Bal. | 20 | 0.005 | Ag: 1.0 Cu: 0.3 | Excellent | Excellent | Good | Excellent |
| EX. 56 | Bal. | 20 | 0.005 | Ni: 0.01 Co: 0.005 | Excellent | Excellent | Good | Excellent |
| Comp. Ex. 1 | Bal. | 10 | | | Excellent | Poor | Poor | Poor |
| Comp. Ex. 2 | Bal. | 12 | | | Excellent | Good | Poor | Poor |
| Comp. Ex. 3 | Bal. | 15 | | | Excellent | Excellent | Poor | Poor |
| Comp. Ex. 4 | Bal. | 20 | | | Excellent | Excellent | Poor | Poor |
| Comp. Ex. 5 | Bal. | 25 | | | Poor | Excellent | Poor | Poor |

TABLE 2-continued

| | Alloy composition (mass %) | | | | Solidus | Liquidus | Oxide film | Total |
|---|---|---|---|---|---|---|---|---|
| No. | Sn | In | Ge | Other elements | temperature | temperature | thickness | evaluation |
| Comp. Ex. 6 | Bal. | 52 | | | Poor | Excellent | Poor | Poor |
| Comp. Ex. 7 | Bal. | 10 | 0.005 | | Excellent | Poor | Good | Poor |
| Comp. Ex. 8 | Bal. | 25 | 0.005 | | Poor | Excellent | Good | Poor |
| Comp. Ex. 9 | Bal. | 10 | 0.01 | | Excellent | Poor | Good | Poor |
| Comp. Ex. 10 | Bal. | 25 | 0.01 | | Poor | Excellent | Good | Poor |
| Comp. Ex. 11 | Bal. | 20 | | P: 0.005 | Excellent | Excellent | Poor | Poor |
| Comp. Ex. 12 | Bal. | 20 | | Al: 0.005 | Excellent | Excellent | Poor | Poor |
| Comp. Ex. 13 | Bal. | 20 | | Mg: 0.005 | Excellent | Excellent | Poor | Poor |
| Comp. Ex. 14 | Bal. | 20 | | Cr: 0.005 | Excellent | Excellent | Poor | Poor |
| Comp. Ex. 15 | Bal. | 20 | | Ti: 0.005 | Excellent | Excellent | Poor | Poor |
| Comp. Ex. 16 | Bal. | 20 | | V: 0.005 | Excellent | Excellent | Poor | Poor |
| Comp. Ex. 17 | Bal. | 20 | | Zr: 0.005 | Excellent | Excellent | Poor | Poor |

TABLE 3

| | Alloy composition (mass %) | | | | Solidus | Liquidus | Oxide film | Total |
|---|---|---|---|---|---|---|---|---|
| No. | Sn | In | Ge | Other elements | temperature | temperature | thickness | evaluation |
| Comp. Ex. 18 | Bal. | 20 | | Nb: 0.005 | Excellent | Excellent | Poor | Poor |
| Comp. Ex. 19 | Bal. | 20 | | Si: 0.005 | Excellent | Excellent | Poor | Poor |
| Comp. Ex. 20 | Bal. | 20 | | Ca: 0.005 | Excellent | Excellent | Poor | Poor |
| Comp. Ex. 21 | Bal. | 20 | | Mn: 0.005 | Excellent | Excellent | Poor | Poor |
| Comp. Ex. 22 | Bal. | 18 | 0.1 | | Excellent | Poor | Good | Poor |
| Comp. Ex. 23 | Bal. | 20 | 0.1 | | Excellent | Poor | Good | Poor |
| Comp. Ex. 24 | Bal. | 22 | 0.1 | | Good | Poor | Good | Poor |

As shown in the tables, the solder alloys according to Examples 1 to 56 were rated as "Good" or "Excellent" for both solidus and liquidus temperatures and thickness of oxide film thickness after long-time holding at high temperature, and also given "Good" or "Excellent" in the total evaluation. In Examples 1 to 56, furthermore, the alpha-ray emission with time can be suppressed in the cases where the U and Th contents as unavoidable impurities are each 5 ppb or less, and also where the As and Pb contents are each 5 ppm or less.

On the other hand, the growth of oxide films was not suppressed after long-time holding at high temperatures in Comparative Examples 1 to 6, in which Ge was not contained. In Comparative Examples 1, 5, and 6, in which the In content was too low or excessive, the result of the evaluation for the liquidus or solidus temperature was "Poor". In Comparative Examples 7 to 10, in which Ge was contained in an appropriate amount, the growth of oxide films was suppressed for long-time holding at high temperatures; however, since the In content was too low or excessive, the result of the evaluation for the liquidus or solidus temperature was "Poor".

In Comparative Examples 11 to 21, In was contained in an appropriate amount, and thus the results of the evaluations for both liquidus and solidus temperatures were "Good" or "Excellent". However, Ge was not included while the other elements were added, and these elements did not suppress the growth of oxide films for long-time holding at high temperatures. In Comparative Examples 22 to 24, in which an excess amount of Ge was contained, the result of the evaluation of the liquidus temperature was "Poor".

The XPS chart is used to illustrate the thickness of the oxide film. FIGS. 2(a) to (c) show XPS analysis charts of the surfaces of the solder balls made of a solder alloy of Example 19, and FIGS. 2(a) to (c) are each charts of different solder balls. FIGS. 3(a) to (c) show XPS analysis charts of the surfaces of the solder balls made of the solder alloy of Comparative Example 4, and FIGS. 3(a) to (c) are each charts of different solder balls. As shown in FIGS. 2(a) to (c), Example 19, in which Ge was contained, resulted in that the oxide film thickness was about 4.0 μm on average. On the other hand, as shown in FIGS. 3(a) to (c), Comparative Example 4, in which Ge was not contained, resulted in that the oxide film thickness was about 17 μm, and it was clear that an oxide film four times thicker than that in Example 19 was formed.

The invention claimed is:

1. A lead-free and antimony-free solder alloy consisting of, by mass %:
   16 to 23% of In,
   0.001 to 0.08% of Ge, and
   optionally, at least one of 3.5% or less of Ag, 0.7% or less of Cu, 0.05% or less of Ni, and 0.02% or less of Co, with the balance being Sn and unavoidable impurities, and
   wherein the solder alloy comprises an oxide film on its surface,
   wherein a thickness of the oxide film is 7 nm or less as measured according to: in an XPS analysis chart, a depth in terms of $SiO_2$ at which a maximum detected intensity of O atom is defined as Do·max (nm), and a first depth in terms of $SiO_2$ at which a detected intensity of O atom is half of the maximum detected intensity in a portion deeper than Do·max is the thickness of the oxide film.

2. The lead-free and antimony-free solder alloy according to claim 1, wherein, by mass %,
   the alloy composition has an In content of 16 to 20%.

3. The lead-free and antimony-free solder alloy according to claim 1, wherein, by mass %,
   the alloy composition has a Ge content of 0.005 to 0.01%.

4. The lead-free and antimony-free solder alloy according to claim 1, wherein, by mass %,
the alloy composition has a Ge content of 0.005 to 0.009%.

5. The lead-free and antimony-free solder alloy according to claim 1, comprising U and Th as the unavoidable impurities each in an amount of 5 mass ppb or less, and As and Pb as the unavoidable impurities each in an amount of 5 mass ppm or less.

6. The lead-free and antimony-free solder alloy according to claim 1, by mass %, further comprising at least one of 3.5% or less of Ag, 0.7% or less of Cu, 0.05% or less of Ni, and 0.02% or less of Co.

7. A solder ball comprising the lead-free and antimony-free solder alloy according to claim 1.

8. The solder ball according to claim 7, having an average diameter of 1 to 1,000 μm.

9. The solder ball according to claim 7, having an average diameter of 1 to 100 μm.

10. The solder ball according to claim 7, having a sphericity of 0.95 or more.

11. The solder ball according to claim 7, having a sphericity of 0.99 or more.

12. A ball grid array formed by using the solder ball according to claim 7.

13. A solder joint formed of the lead-free and antimony-free solder alloy according to claim 1.

14. The lead-free and antimony-free solder alloy according to claim 2, wherein, by mass,
the alloy composition has a Ge content of 0.005 to 0.01%.

15. The lead-free and antimony-free solder alloy according to claim 2, wherein, by mass,
the alloy composition has a Ge content of 0.005 to 0.009%.

16. The lead-free and antimony-free solder alloy according to claim 2, comprising U and Th as the unavoidable impurities each in an amount of 5 mass ppb or less, and As and Pb as the unavoidable impurities each in an amount of 5 mass ppm or less.

17. The lead-free and antimony-free solder alloy according to claim 3, comprising U and Th as the unavoidable impurities each in an amount of 5 mass ppb or less, and As and Pb as the unavoidable impurities each in an amount of 5 mass ppm or less.

18. The lead-free and antimony-free solder alloy according to claim 4, comprising U and Th as the unavoidable impurities each in an amount of 5 mass ppb or less, and As and Pb as the unavoidable impurities each in an amount of 5 mass ppm or less.

* * * * *